United States Patent
Yang

(10) Patent No.: US 7,680,127 B2
(45) Date of Patent: Mar. 16, 2010

(54) ENVIRONMENT DEPENDENT NETWORK CONNECTION SWITCHING SETTING SYSTEM AND METHOD

(75) Inventor: Chuei-Ming Yang, Taichung County (TW)

(73) Assignee: Getac Technology Corporation, Hsin-Chu (TW)

( * ) Notice: Subject to any disclaimer, the term of this patent is extended or adjusted under 35 U.S.C. 154(b) by 1076 days.

(21) Appl. No.: 11/238,060

(22) Filed: Sep. 29, 2005

(65) Prior Publication Data

US 2006/0291385 A1    Dec. 28, 2006

(30) Foreign Application Priority Data

Jun. 22, 2005    (TW) .............................. 94120811 A

(51) Int. Cl.
*H04L 12/56* (2006.01)
(52) U.S. Cl. .................... 370/395.42; 370/231; 370/235
(58) Field of Classification Search ...... 370/229–236.2, 370/251–252, 241.1
See application file for complete search history.

(56) References Cited

U.S. PATENT DOCUMENTS

| 5,687,167 | A | * | 11/1997 | Bertin et al. ................. 370/254 |
| 6,961,762 | B1 | | 11/2005 | Yeap et al. |
| 2004/0062267 | A1 | * | 4/2004 | Minami et al. ............... 370/463 |
| 2005/0066033 | A1 | | 3/2005 | Cheston et al. |

FOREIGN PATENT DOCUMENTS

CN    1601961 A    3/2005

\* cited by examiner

*Primary Examiner*—Thai D Hoang
(74) *Attorney, Agent, or Firm*—Ming Chow; Sinorica, LLC

(57) ABSTRACT

An environment dependent network connection switching setting system and method thereof is provided, wherein the network connection is interrupted due to changes of the network environment of the user, the system is utilized to automatically detect a set of optimal current network setting parameters based on the network setting parameters previously set by the user, and proceed with network connection based on the optimal current network setting parameters, thus facilitating and expediting network connection in the changing network environments.

10 Claims, 4 Drawing Sheets

ENVIRONMENT DEPENDENT NETWORK CONNECTION SWITCHING SETTING SYSTEM AND METHOD

BACKGROUND

This Non-provisional application claims priority under 35 U.S.C. § 119(a) on Patent Application No(s). 94120811 filed in Taiwan on Jun. 22, 2005, the entire contents of which are hereby incorporated by reference.

1. Field of the Invention

The invention relates to a computer network connection technology, and in particular to a system and method used for a computer having various network connection devices which is capable of automatically switching the network connections depending on the changes of its operation environments.

2. Related Art

With the rapid development and innovation of science and technology, the technology of computers has progressed tremendously. In addition, the network technology has also changed enormously. Due to the reduction of production costs of the network equipment, the overall selling prices declined drastically, as such the data transmission speed of network and its cost effectiveness has increased significantly. Most importantly, the network connection is no longer restricted to the wired network, thus various other alternatives are available for selection.

In the early stage of utilization, the network connection was conducted through conventional telephone lines and modems, with its maximum data transmission speed of only 56 k. Subsequently, the LAN (Local Area Network) was adopted and utilized, and its application has expanded from academic and research institutes to business and enterprises with its data transmission speed of up to 100 Mb/sec. However, in this respect, its application is limited to the internal activities of the enterprise, since the costs of severs and gateways used for connecting to Internet are too expensive for ordinary people. Hereafter, the ADSL (Asymmetric Digital Subscriber Line) provided by the ISP (Internet Service Provider) was utilized to do the network connection through cables, so that the public could have the benefits of faster speed of data transmission on the network.

Similarly, in the preliminary stage of utilization, the mobile phone was used in voice communication, then with the development and introduction of the technology of GPRS (General Packet Radio Service), which is based on a wireless division exchange technique of GSM system having advantages of always being on-line, high speed transmission, and easy switching, so as to realize the purpose and function of network connection at any place and any time. However, as in the early stage of network application, the data transmission speed of the mobile phone had left much to be desired.

In recent years, the WLAN (Wireless Local Area Network) has become widely popular since it is capable of achieving a data transmission speed of a wired network without requiring a connection line. Presently, the wireless network connection capability has become a basic and standard specification of the computer for the various computer manufacturers, thus a wireless network connection capability has become the indispensable feature and function of the present day computer system, even though various problems in its application have yet to be solved.

From the above discussion it is known that, presently, network connection of a computer is not restricted to only one method. The computer may be provided with the equipment of wired network connection or wireless network connection. In particular concerning the notebook computer, the wireless network connection capability is indispensable to satisfy the moving office requirements of the user, which is dependent on various network connection environments, such as: network connection through a cable if the user is at home, network connection through an Ethernet Network if the user is in his office, network connection through ADSL if the user is at his customer's premises, or network connection through wireless LAN if the user is at the coffee shop or Mass Rapid Transit station (subway), or network connection even through the GPRS of a mobile phone if the user is on the Super Highway and has to transmit data urgently.

However, presently, the set values and connection method for various network connection modes are different, thus if the user is relocated to a different working environment, the parameter values of the network connection have to be reset. As such, the user has to keep and memorize a whole set of network connection setting parameter values for various working environments, which is very tedious and inconvenient for the user.

SUMMARY OF THE INVENTION

In view of the above-mentioned problems and shortcomings of the prior art, the object of the invention is to provide an operation environment dependent network connection switching setting system and method, which is capable of actively detecting the current network environment by making use of the network connection parameters previously set in the network connection data base, after the current network connection is interrupted due to the change of operation environment of the user, and select the network connection device most suitable for the current environment, so that the user does not have to select and set the parameters of the network device manually, thus achieving the establishment of network connection.

To achieve the above-mentioned objective, the invention provides an environment dependent network connection switching setting system, including at least the following elements:

A network connection data base, used to store the setting parameters of the various network connection devices previously set by the users; a network module, containing a plurality of network connection devices, used to establish several connections with Internet; a detection module, used to detect whether the computer is currently in a network connection state, and load in the network setting parameters of various network connection devices from the network connection data base, further, send out test packets to the test module to detect the network connection devices available and their statuses; a setting module, used to receive the network parameters set by the user concerning various network connection devices, and write said network parameters into the network connection data base, and receive the identity of the tested optimal current network connection device sent from the detection device, and load in and set the network setting parameter of this optimal network connection device from the network connection data base.

A selection module, used to receive the network setting parameters of the optimal current network connection device to be set from the setting module, proceeds with activation and driving of the network connection device.

In addition, the invention provides an environment dependent network connection switching setting method, which is used to be applied on a computer system having various network connection devices, and automatically establish a network connection based on the network environment and Internet, including the following steps:

Determine if the computer system is in the network connection state. When it is determined that the computer system is not in the network connection state, send the testing packets corresponding to its network setting parameters respectively to various network connection devices in the system according to the respective existing network setting parameter in the network connection data base. Then, connect the respective network connection device to the Internet to test its network status, and send the respective network status thus obtained back to the detection module, which is used to determine the priority of utilizing the network connection device based on the respective network status, and load in the network setting parameter of the network connection device having the highest priority by the setting module from the network connection data base. Finally, drive the network connection device to proceed with network connection by making use of the parameters.

Moreover, according to another embodiment of the invention, when various network connection devices in the system are not able to establish the network connection based on the existing network setting parameters obtained from the network connection data base, the system performs the following steps: Firstly, display a message informing the user to add a new set of network setting parameters. Then, receive the network setting parameters set by the user to proceed with the network connection, and check and determine if this network connection can be established. If the answer is affirmative, then it is determined that the set of network setting parameters are valid and write the parameters into the network connection data base.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below, which is for illustration only and thus is not limitative of the invention.

DETAILED DESCRIPTION OF THE INVENTION

The purpose, construction, features, and functions of the invention can be appreciated and understood more thoroughly through the following detailed description with reference to the attached drawings.

The invention provides an environment dependent network connection switching setting system and method. In the following descriptions, various details are described to provide a complete understanding of the invention. However, to people familiar with the art, the invention can be implemented without these specific details, or it can be implemented with alternative elements or methods. In other circumstances, the well known methods, procedures, elements, and circuits are not described in detail, in order to avoid obscuring the essence of the invention.

Figure 1:
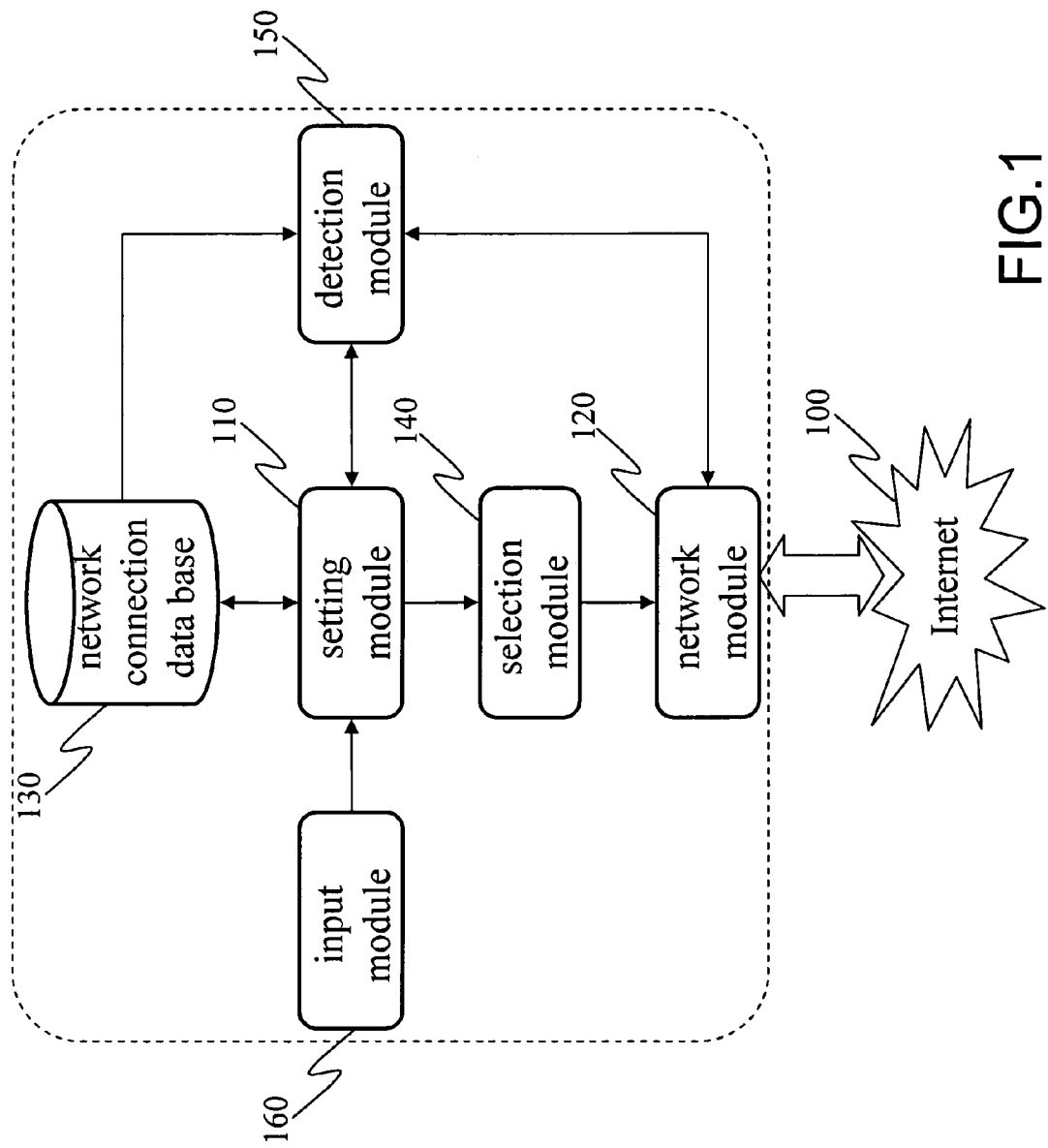
FIG. 1 is a system block diagram of the environment dependent network connection automatic switching setting system according to a preferred embodiment of the invention.

Refer to FIG. 1 is a system block diagram of the environment dependent network connection automatic switching setting system according to a preferred embodiment of the invention, which is used to automatically establish a network connection between the computer system and Internet 100, when the user is in a changing network environment, including the following devices:

An input module 160, which usually includes a keyboard, a mouse, a touch control panel or a joy stick, so that the user is able to add and set a new existing network or reset the existing network setting parameters of various network connection devices, for example: the address of the Internet Communication Protocol, the setting of the DNS (Domain Name System) and gateway, and the verification account code and password of log-in. To realize the above-mentioned functions, a network connection data base 130 is provided to store the network setting parameters of the various network connection devices input by the user, so that they can be retrieved and verified, when the computer system is required to re-establish network connection with the Internet 100. Since the chance of a user changing his operation environment is not too great, if the previous settings are available to use, then the efforts required for reestablishing network connection can be significantly reduced.

Figure 2:
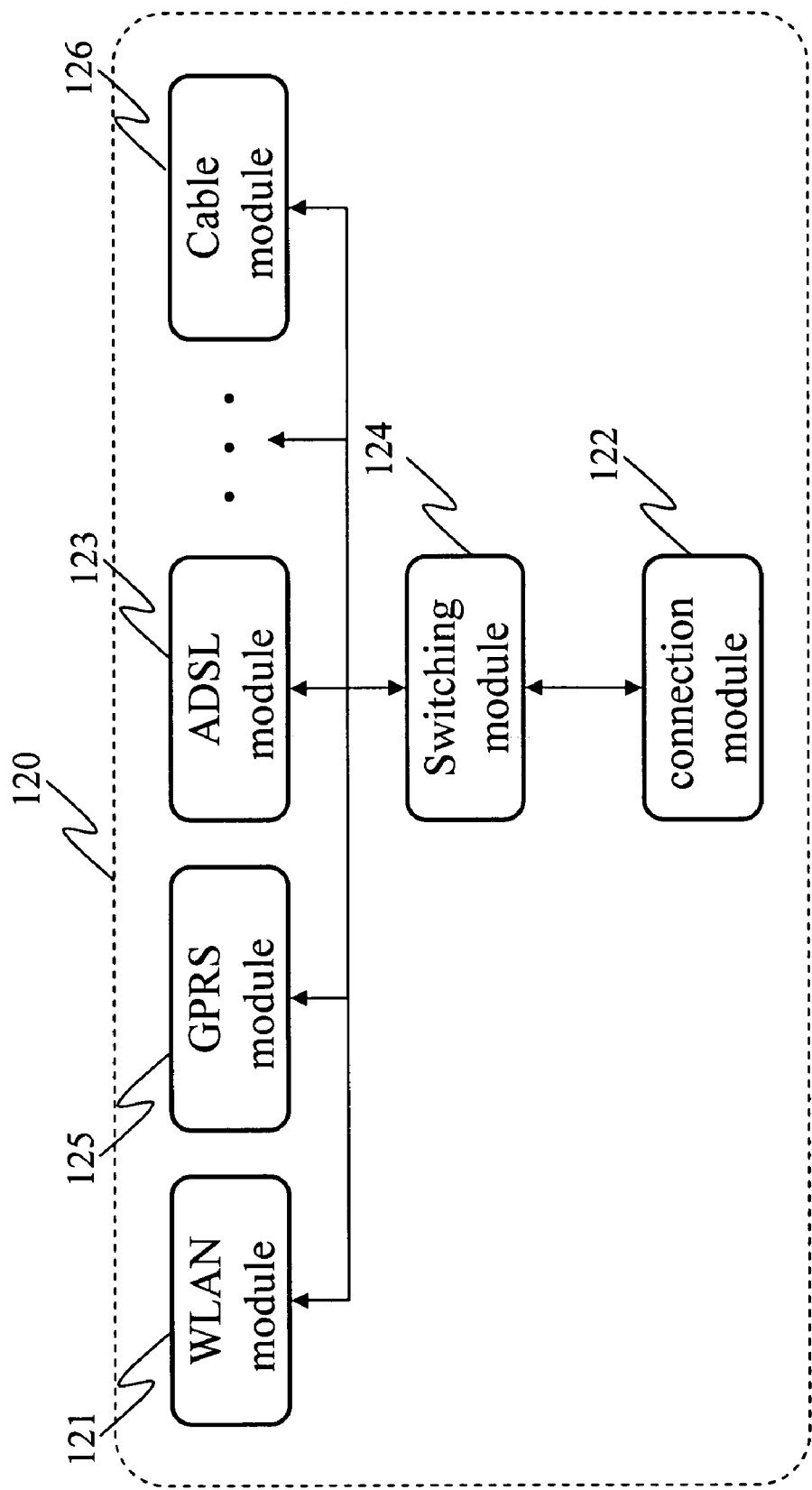
FIG. 2 is a structure block diagram of the network module of the environment dependent network connection automatic switching setting system according to a preferred embodiment of the invention.

In addition, a network module 120 is provided, which is composed of various network connection devices for establishing connection with the Internet 100. Refer to F FIG. 2 for a detailed structure block diagram of this module, including various wired and wireless network connection devices, such as a WLAN (Wireless Local Area Network) module 121, a General Packet Radio Service (GPRS) module 125, an Asymmetric Digital Subscriber Line (ADSL) module 123, and a Cable module 126. Thus the activation and deactivation of them are controlled and coordinated by a switching module 124, so that computer can be connected to the Internet 100 through the connection module 122 by means of various network connection devices.

To fully understand the network connection state of the computer at this time, a detection module 150 is provided, which is used to detect automatically or under the instructions of the user to check if the computer has established network connection with the Internet 100. This can be realized by packet transmission from a network module 120. If the packets can not be transmitted out, namely, a replay message is not received from the destination of this transmission, then it is determined that the computer is in the off-line state and is not connected to the Internet, thus the detection module is used to load in the network setting parameters for various network connection devices from the network connection data base 130, and send out a test package for detecting the network connection devices available to use in a network module 120 and their conditions. The consolidated report is sent back to a setting module 110, in which a set of network connection devices having highest priority are selected to proceed with network connection.

A setting module 110 is used to receive the network setting parameters of various network connection devices set by the user, which are written and stored in a network connection data base 130 after being verified by the detection module 150, and is also used to receive the network connection device of the optimal current condition as verified and transmitted from the detection module 150. Then it is used to load-in and set the network setting parameters of the optimal network connection devices from the network connection data base 130.

Furthermore, a selection module 140 is provided in the network connection setting system, which is used to receive the network setting parameters of the optimal current network connection device transmitted from the setting module 110, then it is used to drive the network connection device thus selected in the network module 120 to proceed with network connection.

Figure 3:
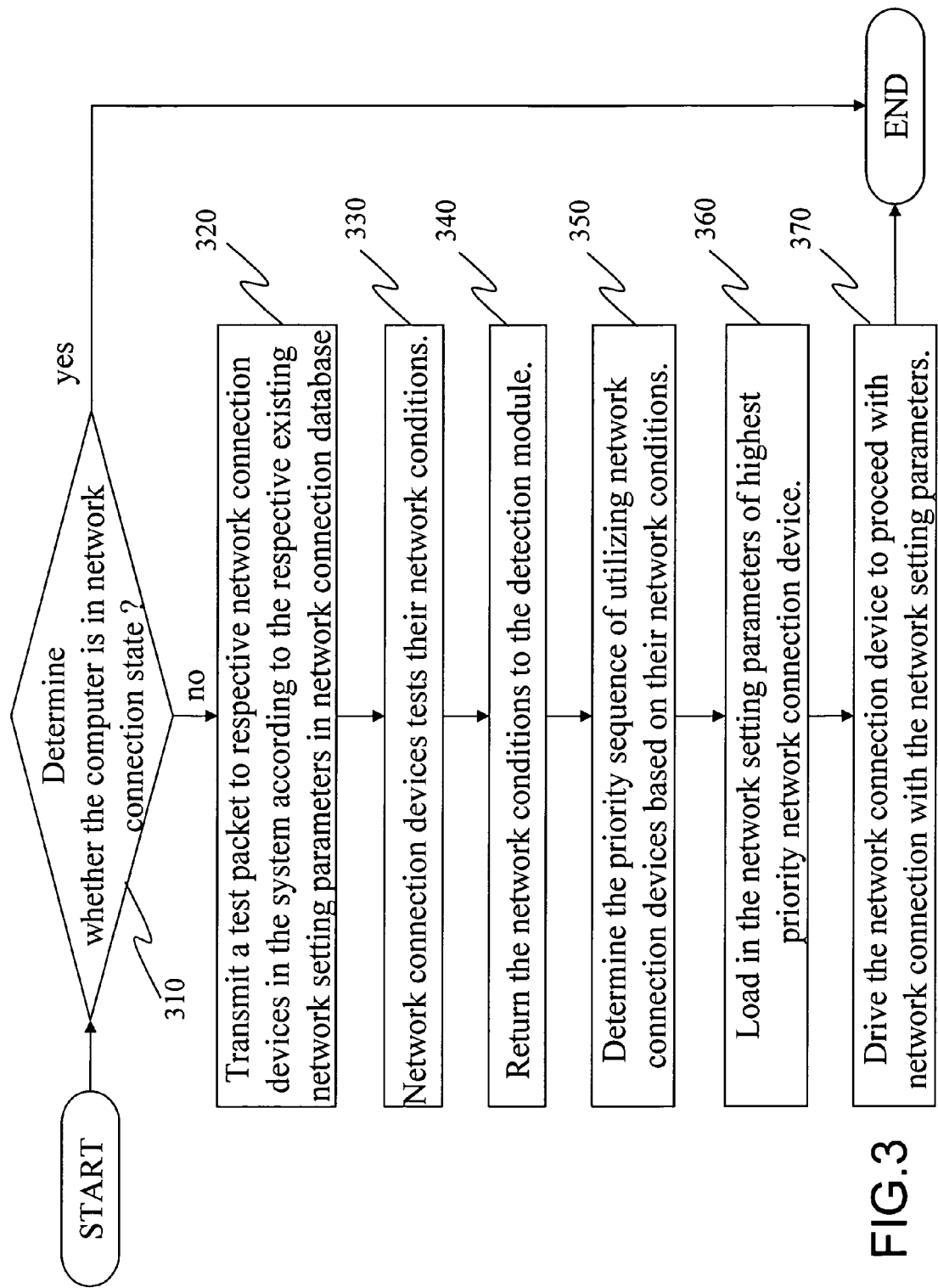
FIG. 3 is a system flowchart of network connection of the environment dependent network connection automatic switching setting method according to a preferred embodiment of the invention.

Subsequently, refer to FIG. 3 for a system flowchart of the network connection of the environment dependent network connection automatic switching setting method according to a preferred embodiment of the invention. Firstly, it is determined if the computer system is in network connection state (step 310). Next, if it is determined that the computer system is not connected to the Internet 100, then the selection module 140 transmits the test packets of the network setting parameters to the network module 120, based on the respective existing network setting parameter in the network connection data base 130 concerning the respective network connection device in the system (step 320). Subsequently, the switching module 124 of the network module 120 executes the testing of the respective network connection device (step 330). As such, the respective network connection device starts communicating with the Internet 100 to test its network conditions, and the respective tested result is transmitted back to the detection module 150 (step 340).

Then, the detection module 150 is utilized to determine a priority order for the network connection device to be used, based on network conditions of the respective network connection device, such as the data transmission speed and packet loss ratio (step 350). Further, if respective network connection device can not be connected to the Internet, then an error message is displayed and the priority order of network connection devices can not be produced, thus the setting module 110 is used to load-in the network setting parameters of the highest priority network connection device from network connection data base 130, or it may be set by the user (step 360). Finally, the network connection device is used to proceed with the network connection of the computer system and the Internet 100 by making use of network setting parameters (step 370).

Figure 4:
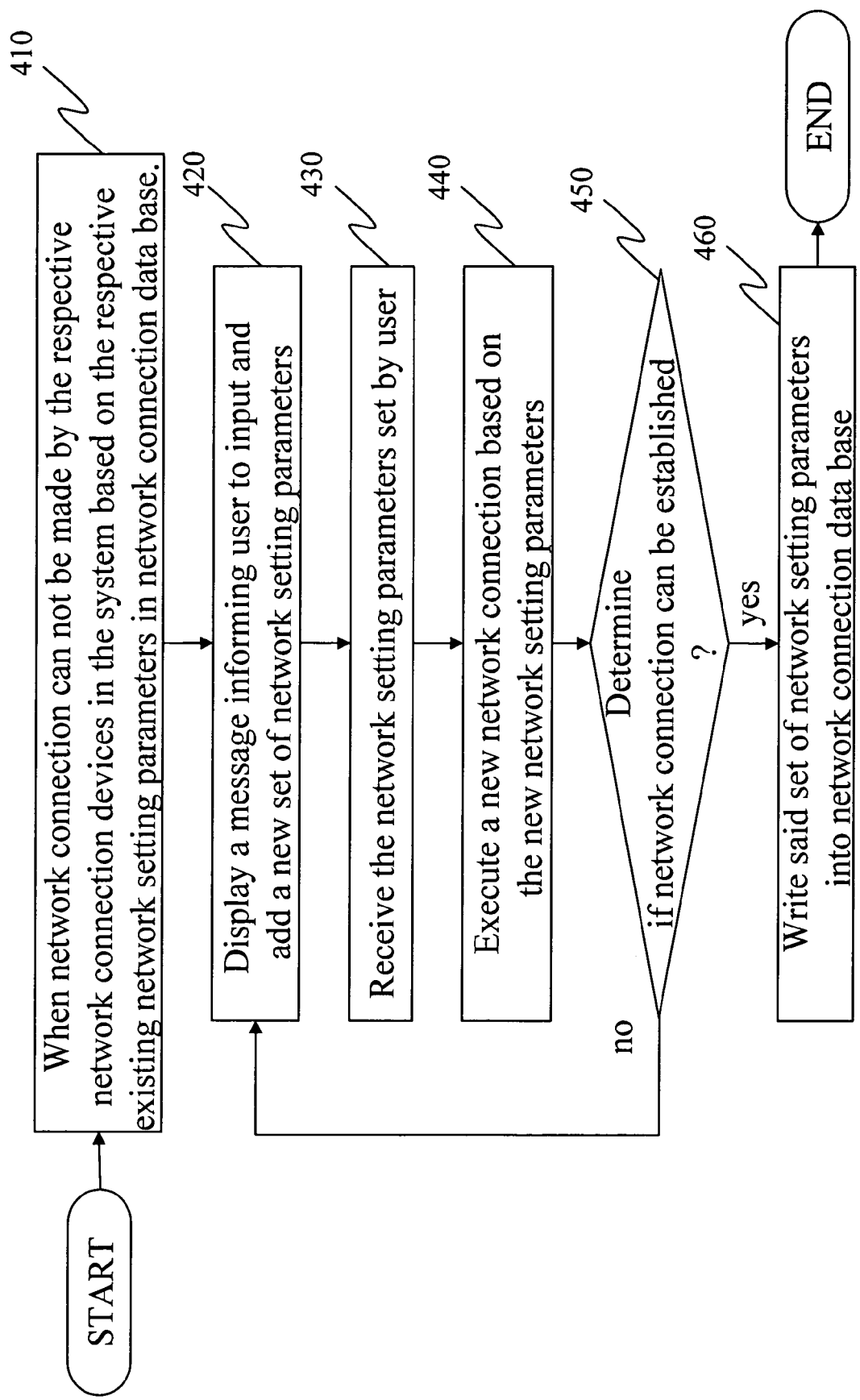
FIG. 4 is a system flowchart of network connection of the environment dependent network connection automatic switching setting method according to another preferred embodiment of the invention when a network connection can not be established with the existing network setting parameters in the network connection data base.

However, if the network connection of the computer system and Internet 100 can not be realized through the above-mentioned method in the embodiment by making use of the network connection data set previously by the user, then it means the network environment has changed, thus the user has to reset the network setting parameters in the new network environment. Therefore, refer to FIG. 4 for a system flowchart of the network connection of the environment dependent network connection automatic switching setting method according to another preferred embodiment of the invention.

When a network connection can not be realized by the respective network connection device by means of the respective existing network setting parameters in the network connection data base 130 (step 410). Then, firstly a message is displayed by the system to inform the user that the data in network the connection data base 130 is incapable of making a network connection, and a new set of network setting parameters must be added for the new network environment (step 420). Next, the input module 160 is used to receive the network setting parameters set and be input by the user (step 430). Then, the detection module 150 is used to try to make a new network connection utilizing said parameters (step 440), and check if network module 120 is capable of making a new network connection (step 450). If the test packets can be successfully sent out and there is no lost data packet, the network connection is effective and the network connection parameter is written into the network connection data base 130, and the related network connection is set accordingly (step 460).

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An environment dependent network connection switching system comprises of:
    a plurality of network connection devices;
    a setting module receiving network parameters from an input module;
    a network connection data base comprising of the network parameters corresponding to said network connection devices;
        the network module being connected to the Internet and establishing a network connection by one of said network connection devices in accordance with network parameters for the connected network connection device;
    a detection module being connected to the network connection database, the network module, and a setting module, wherein the detection module detecting a current state of the network connection by transmitting a test packet to a remote system on the Internet;
    the setting module being connected to the network connection database, the detection module, the selection module, the network module, and the input module, wherein the setting module receiving the current state of the network connection transmitted from the detection module, and
        the setting module generating a priority sequence of the network connection devices when the current state of the network connection is no connection; and
    a selection module wherein the selection module selecting a network connection device of a highest priority from said priority sequence, retrieving network parameters for the highest priority connection device from said network connection data base, and transmitting the retrieved network parameters for the highest priority connection device to said network module for establishing a network connection.

2. The environment dependent network connection switching system as claimed in claim 1, wherein
    said input module comprising of a keyboard, a mouse, and a touch control panel or a joy stick.

3. The environment dependent network connection switching system as claimed in claim 1, wherein
    said system further comprising of a display module to display the current state or an error message.

4. The environment dependent network connection switching system as claimed in claim 1, wherein
    said network module comprising of:
    a connection module transmitting and receiving the test packet;

a plurality of network connection devices wherein only one of the network connection devices is connected to the network after the highest priority connection device is selected; and a switching module switching among said respective network connection devices after the highest priority connection device is selected.

5. The environment dependent network connection switching system as claimed in claim 4, wherein said plurality of network connection devices are selected from the group consisting of a WLAN (Wireless Local Area Network) module, a GPRS (General Packet Radio Service) module, an ADSL (Asymmetric Digital Subscriber Line) module, and a Cable module.

6. An environment dependent network connection switching method comprising, determining a current state of a network connection;

sending a test packet from a detection module through a plurality of network connection devices to a remote system of the Internet when the current state is no connection;

receiving network condition reports of said network connection devices;

generating a priority sequence of said network connection devices and corresponding network parameters of the network connection devices; and selecting a highest priority network connection device from said priority sequence, loading network parameters of the selected network connection device from a network connection data base for establishing a network connection.

7. The environment dependent network connection switching method as claimed in claim 6, wherein said plurality of network connection devices are selected from the group consisting of a WLAN (Wireless Local Area Network) module, a GPRS (General Packet Radio Service) module, an ADSL (Asymmetric Digital Subscriber Line) module, and a Cable module.

8. The environment dependent network connection switching method as claimed in claim 6, wherein the network condition reports of said network connection devices includes information of data transmission speed and lost packet ratio.

9. The environment dependent network connection switching method as claimed in claim 6, wherein when the current state is no connection:

displaying a message to inform a user to input and add a new set of network setting parameters;

receiving a set of network parameters input from an input module;

establishing a new network connection based on said set of network setting parameters; and storing said set of network parameters into said network connection data base after the new network connection is established.

10. The environment dependent network connection switching method as claimed in claim 9, wherein said network parameters input from said input module include: IP (Internet Protocol) address and settings of DNS (Domain Name System) and gateway.

* * * * *